July 29, 1969  D. H. REIFF  3,458,022
SELF-ADJUSTING CLUTCH OR BRAKE
Filed Sept. 12, 1967
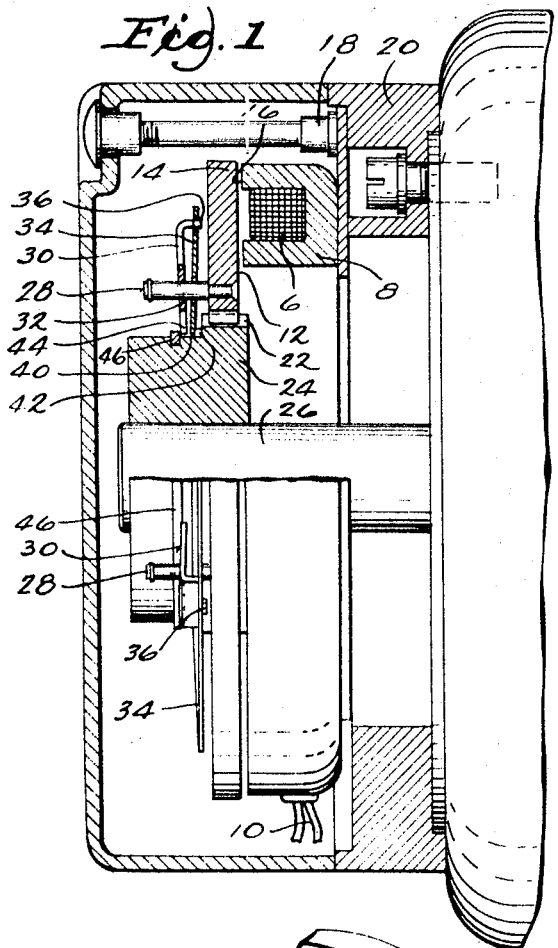
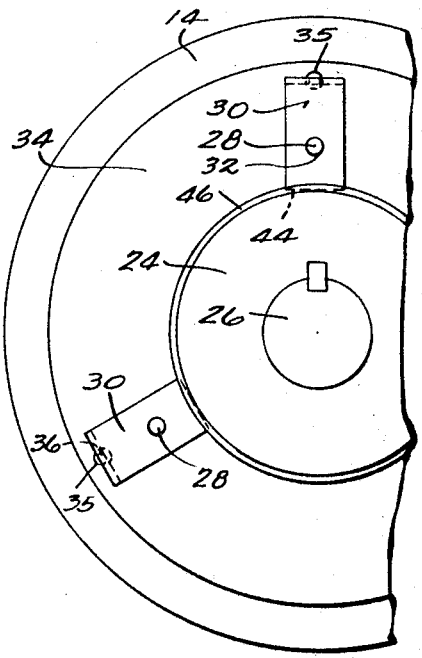
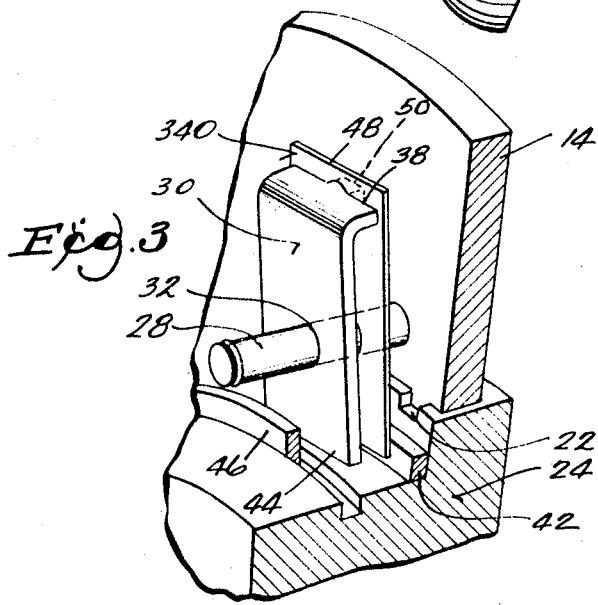
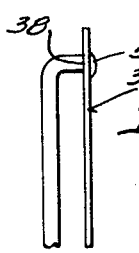
INVENTOR
DONALD H. REIFF
BY Wheeler, Wheeler, House & Clemency
ATTORNEYS

United States Patent Office 3,458,022
Patented July 29, 1969

3,458,022
SELF-ADJUSTING CLUTCH OR BRAKE
Donald H. Reiff, Cedarburg, Wis., assignor to Stearns Electric Corporation, Milwaukee, Wis., a corporation of Wisconsin
Filed Sept. 12, 1967, Ser. No. 667,226
Int. Cl. F16d 37/02, 13/60
U.S. Cl. 192—84                                   8 Claims

ABSTRACT OF THE DISCLOSURE

An armature retracting spring acts through a motion limiting plate normally cramped on a post which may project from the armature or from the hub. When armature movement becomes greater due to wear, the plate engages a stop which releases its cramping action to permit independent relative movement of the armature and post, thereby readjusting the range of armature operation.

Background of the invention

In most of the self-adjusting arrangements of the prior art, the adjustment depends on a differential resistance to relative movement between two parts, the degree of friction being greater in one direction than the other.

In the companion application of Lloyd Fitzgerald, Ser. No. 642,388, filed May 31, 1967, now Patent No. 3,394,787, there was disclosed a self-adjusting organization in which friction in the direction of adjustment is virtually eliminated by means functioning automatically in response to a need for adjustment. The instant invention operates similarly but has advantages in the way of low cost and long life.

Summary of the invention

The device may be regarded either as a clutch or a brake. In both cases it is a clutch in fact. As illustrated, it functions as a brake because the armature is frictionally engageable with a relatively fixed part rather than a rotatable part.

The armature reciprocates axially in advancing toward and retracting from the part which it engages. Its retraction is spring biased and the object of the invention is to control the range of its movement so that it cannot exceed a predetermined maximum retraction. The range would increase with wear but for the present invention which provides stop mechanism that adjusts itself as wear occurs.

The armature retracting spring does not act directly upon the armature but acts through a plate which is normally held by the spring in a position in which the plate is slightly tilted with reference to a post. In one embodiment, the post is connected with the armature. In another, it is fixed to the hub. The tilting of the plate respecting the post cramps the plate to lock it to the post. In the event of wear, the plate takes a new position with reference to a stop which, upon engagement with the plate, releases the cramping action to permit the slight independent movement of the armature which is required to readjust the range to compensate for the wear.

Since a plate does not require the flexing movement required to bring about this result with a resilient arm, the instant device is free of fatigue breakage.

The end of the generally radial plate which is closest to the hub moves between axially fixed stops. The stop most remote from the armature is engaged by the plate when the armature moves in a retracting direction. The direction of engagement is such as to tend to increase the cramping action of the plate on the post, thereby positively limiting armature movement in a retracting direction. The stop which is closest to the armature is engaged by the plate in a direction of relative advancing movement in which the armature is moving toward the surface which it engages when attracted by the magnet. In this direction of relative movement, the plate tends to become normal to the post on which it is mounted, thereby relieving the cramping action. Therefore, if engagement with this particular stop occurs before the armature contacts the cooperating clutch or brake surface, the cramping engagement of the plate on the post will be released and the slight movement of the post through the aperture of the plate pending full engagement of the armature with the complementary clutch or brake surface will provide the necessary readjustment to maintain the range of relative movement of the armature at a substantially constant value. Since the plate is rigid, it does not deteriorate as the result of "fatigue."

It should be added that inasmuch as the last mentioned stop also serves to fix the position of the inner end of the armature retracting spring, the plate does not directly engage the stop, the spring being interposed. The spring itself is the nominal stop. The spring may be annular in form, in which case it requires no positive connection with the plate. In an alternative construction, the spring is on the order of a leaf spring, in which case it is fixed to the outer end of the finger or plate and has a free inner end engaged with the last mentioned stop.

Brief description of drawings

FIG. 1 is a view in diametrical section through a clutch or brake embodying the invention.

FIG. 2 is a fragmentary view in end elevation.

FIG. 3 is an enlarged fragmentary detail view in perspective showing a modified embodiment of the invention.

FIG. 4 is a fragmentary detail view in side elevation of the connection between the plate and spring in the embodiment of FIG. 3.

Description of preferred embodiment

The winding 6 of the electromagnet 8 may be energized by current supplied through the leads 10 to attract the friction surface 12 of the armature 14 into engagement with the complementary friction surface or surfaces 16 on the frame of the magnet. Since the magnet is anchored by a bolt 18 to a fixed element 20, it cannot rotate and the engagement of surfaces 12 and 16 therefore functions to brake the rotation of armature 14. The armature is mounted for rotation on the splines 22 of the hub 24 on shaft 26.

The armature 14 comprises a disk provided at intervals with axially projecting posts 28, preferably three in number. Mounted on each post is a substantially rigid finger or cramping plate 30 which has an aperture 32 closely fitted about the post and free to slide axially on the post when the plate is nearly perpendicular to the post.

The cramping plate is normally held in a cramping position in which it is slightly inclined to the post, being biased to that position by the annular clutch spring 34 which encircles the hub 24 and is apertured at 35 to receive a tongue 36 that projects from the end of plate 30 with shoulders 38 at each side of it, as best shown in FIG. 2. This spring biases the armature away from the magnet 8, acting on the armature through plates 30 and the posts with which these plates are engaged by the described cramping action. The inner perimeter 40 of the annular spring is free in the sense that it is not connected to the hub. It does, however, have very limited movement, being confined between the annular stop 42 and the inner end portions 44 of the plate 30. It is never stressed unduly, nor is it reversed in direction of flex, nor is the spring cramped upon the post. Consequently, it has long life, being free of factors which might result in fatigue of the metal.

As will hereinafter be explained, the limiting stop 42 not only confines the inner perimeter 40 of spring 34 but also limits axial movement toward the armature of the inner end 44 of plate 30. In this respect the inner perimeter of the spring may be regarded as the stop engaged by the inner end of the rigid cramping plate.

FIG. 1 shows the parts in a position in which the armature 14 is retracted from engagement with the complementary friction surface 16. This retracted position is defined by engagement of the inner end 44 of plate 30 with the stop 46 as shown in FIG. 1. The parts are biased toward this position by the spring 34. It will be observed that plate 30 is not normal to the post 28 but is tilted sufficiently to be cramped thereon. This positively locks the armature 14 and post 28 against any further retractive movement to the left as viewed in FIG. 1.

When the winding 6 is energized, the magnet 8 attracts the armature 14 to clutch its friction surface 12 to the complementary friction surface 16. Since the magnet is non-rotatable, this will brake rotation of shaft 26 and hub 24. For optimum operation, the distance for which the magnet is required to move the armature should be kept to a predetermined minimum. This distance tends to increase as wear occurs between the friction surfaces 12 and 16. In the event that the range of movement becomes great enough to permit the lower extremity 44 of plate 30 to engage a stop (the ring 42 through the interposed lower end of spring 34), the plate will be straightened toward a normal position respecting post 28. Thereupon cramping action is eliminated and the armature 14 and the post 28 will continue independent axial movement to effect full clutch engagement.

If the clutch engagement is completed before plate 30 releases post 28, there will be no change effected in the range of movement of the parts. Only if the lower free end portion of plate 30 is stopped prior to such full engagement of the clutch will the armature be released from the plate and permitted to continue independently thereof.

In lieu of the full annular spring 34 as above described, I may use a narrow spring 340 on the order of a clock spring as shown in FIGS. 3 and 4. It now becomes necessary to secure this spring in a position for operation as above described. For this purpose, the upper end 48 of the spring 340 is held tightly to the shoulder 38 by the provision of a head 50 on the tongue 36 of plate 30 (FIG. 4). The operation is identical with that above described and all the parts are identical except for the substitution of spring 340 for spring 34. It will be understood that each of the several posts 28 with which the armature disk 14 is provided will be equipped with one of the plates or fingers 30 and one of the springs 340.

What is claimed is:

1. In a self-adjusting clutch which includes an electromagnet and a rotor on which an armature is mounted for movement to and from the magnet, and means for limiting the range of movement of the armature with respect to the magnet, the improvement in said means which consists in the provision of posts projecting from the armature, a generally radial and substantially rigid cramping plate for each post, each plate having an aperture through which the respective post projects, spring means which comprises a resiliently flexible flat spring plate generally parallel to the armature and having radially outer portions acting through each of said cramping plates and posts for urging the armature away from the electromagnet, said spring means acting on the ends of the cramping plates which are most remote from the rotor, and stop means on the rotor for limiting the movement toward the magnet of the ends of the cramping plates which are nearest the rotor and adapted to arrest the movement of the last mentioned ends toward the electromagnet when the range of the armature movement becomes excessive, thereby straightening the said cramping plates on their respective posts and reducing cramping action to permit continued independent movement of the armature and posts.

2. A clutch according to claim 1 in which the spring means comprises an annulus encircling the rotor and having an inner peripheral portion engaged with said stop means and having outer peripheral portions engaged with the outer ends of the respective plates.

3. A clutch according to claim 1 in which the spring means comprises a resilient strap fixed at its outer end to the end of a plate and having a free inner end portion engaged with said stop means.

4. A clutch according to claim 1 in which the electromagnet is fixed against rotation and has means providing a clutch surface which the armature engages when the electromagnet is energized, the rotor and armature having interengaged means requiring the rotor and armature to rotate together while accommodating axial movement of the armature toward and from the electromagnet, the rotor having a shoulder and the spring means having an inner portion engaged with the shoulder and an outer portion engaged with the outer end of said plate.

5. A clutch according to claim 4 in which the inner portion of the spring means constitutes said stop means.

6. A clutch according to claim 4 in which the spring means has an aperture through which projects a tongue with which the outer end of the plate is provided.

7. A clutch according to claim 6 in which the spring means comprises an annulus encircling the rotor.

8. A clutch according to claim 6 in which the spring means comprises a resilient strip which is generally radial and disposed between the plate and the armature, the portion of said plate which is provided with the aperture having said tongue provided with a head in a rigidly fixed clamping engagement with a portion of the spring means remote from the rotor.

References Cited

UNITED STATES PATENTS

| | | |
|---|---|---|
| 2,536,269 | 1/1951 | Driscoll. |
| 2,607,442 | 8/1952 | Lucker et al. |
| 2,808,917 | 10/1957 | Harter. |
| 2,981,379 | 4/1961 | Burrell. |
| 3,091,310 | 5/1963 | Smith et al. |
| 3,221,854 | 12/1965 | Jacschke et al. |
| 3,286,803 | 11/1966 | Zeidler. |
| 3,297,122 | 1/1967 | Simonson. |
| 3,338,349 | 8/1967 | Klinkenberg et al. ____ 188—161 |
| 3,337,013 | 8/1967 | Wrensch. |

CARLTON R. CROYLE, Primary Examiner

A. D. HERRMANN, Assistant Examiner

U.S. Cl. X.R.

188—161, 196; 192—111